Patented June 19, 1951

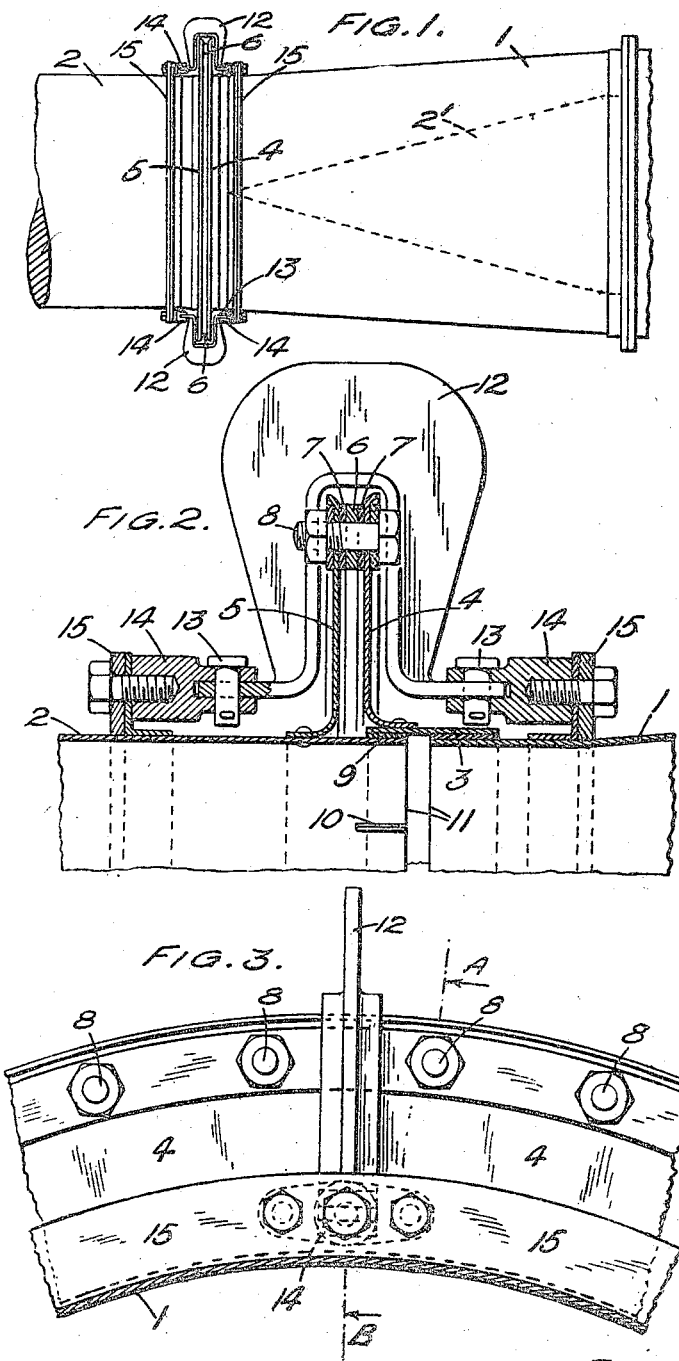

2,557,304

UNITED STATES PATENT OFFICE 2,557,304

PROPULSIVE JET APPARATUS

Roderick Cristall McLeod, Cropston, Leicester, England, assignor to Power Jets (Research & Development) Limited, London, England Application August 14, 1945, Serial No. 610,736
In Great Britain April 27, 1942

Section 1, Public Law 690, August 8, 1946
Patent expires April 27, 1962

8 Claims. (Cl. 285—129)

This invention relates to propulsive jet apparatus, and particularly to the jet or exhaust pipe of an aircraft or like propulsive system in which a power unit expels a stream of hot gas at high velocity. It has been found somewhat difficult in installations of such arrangements, to accommodate thermal expansions, whilst taking care of other factors. Where a jet pipe is lengthy and is supported by attachment to the power unit at its forward end, and by some form of suspension or support more rearwardly, it is difficult to arrange for exact alignment in the complete installation, particularly in view of thermal expansions, and the loads which are applied to the system in use, such as loads due to accelerations. Moreover, the parts involved may be of comparatively light-gauge sheet metal and are not well adapted to resist stresses tending to buckle them. Again, it may be desirable to preclude all reasonable possibility of gas leakage, and also to leave the internal surface of the pipe very smooth and flush. There may be considerable end load due to gas flow conditions, usually in the form of tension in the jet pipe.

Whilst it is desirable that the surface internal wall of the jet pipe should be smooth and uninterrupted in order to minimise loss of efficiency, it is found that a slight stepping (such as will be seen hereinafter) due to thickness of sheetmetal, can be regarded as insignificant and a wall having such a form can be regarded as substantially smooth for practical purposes. It is probably important however that such formations should be minimised as far as possible, and that uncontrolled open gaps or leakages, especially in the region of such stepping, should be avoided since their presence may promote undue turbulence with consequent loss. If there were to be any substantial discontinuity of the pipe wall, it would probably be preferable to make it deliberately in a properly designed and controlled manner, in which case it may not be undesirable. The present invention is however concerned with cases in which gas tightness is required.

According to this invention there is provided in a jet propulsion exhaust or jet pipe, a gastight flexible joint so arranged as to permit some flexibility of alignment without substantial resistance and such as to leave the internal wall of the pipe substantially smooth and uninterrupted. It will be appreciated that a pipe of comparatively large diameter even if made of thin sheet metal, is very rigid in bending and can offer such substantial resistance that high stresses can be imposed by tendencies to bend for example due to deflections in an aircraft structure; the object of the joint is to afford relatively low resistance to deflections, particularly of alignment, whilst preserving gas tightness.

The invention further provides in a jet propulsion power plant for aircraft, an exhaust or jet pipe having a virtually continuous and smooth internal wall with a flexible and gas tight joint between adjacent lengths or sections of the pipe to permit flexing of the pipe as a whole (e. g., deflections from strict alignment) without substantial resistance, the joint comprising a radially extending structure having the requisite flexibility and in hermetic sealed attachment to the pipe sections, the ends of these sections being arranged to mate with freedom for relative movement without substantial breaking of the smooth continuity of the pipe wall. In view of the fact that end-wise or axial loads may have to be transmitted from one length or section of the jet pipe to the other, means may be provided for transmitting such loads and more especially tension, across the joint without impeding flexibility at least about one plane; it may here be mentioned that it is anticipated that serious deflections of the structure or pipe are only to be expected in one plane and in such cases it may therefore be sufficient to afford flexible freedom about one plane which in present conceptions is a horizontal plane. The structure of the flexible parts is preferably in the form of outwardly extending webs or flanges of sheet metal attached in a hermetic gas-tight manner in the region of the joint to the adjacent pipe sections, these webs being inter-attached towards their outer margins also in gas-tight manner; they may in effect be flat annular plates inter-attached through an annular rim which spaces them. The material forming the wall of the pipe is intended to be sheet metal or other thin metal, and the pipe sections where they mate are preferably provided with a spigot type of joint in such a manner as to present a substantially smooth continuous inner surface whilst permitting the required slight relative movement between the sections, the joint as a whole not depending upon the spigot to be gas-tight.

Pipe joints are already known in which there is provision for slight universal angular movement, or for expansion and contraction whilst leaving the internal wall of the pipe substantially smooth and uninterrupted; in some of these, flexible corrugated or bellows-like but fluid-tight structures surround a spigot joint and it has been proposed to provide tension linking between the two pipes which are joined to prevent undue stressing of the flexible structure. No claim is made herein to the construction of such joints as such. The present invention is concerned with the application of joints having certain attributes to the particular case of jet propulsion wherein special problems arise.

The invention is illustrated in the accompanying drawing in which Fig. 1 is a diagrammatic external view in plan, Fig. 2 an enlarged partial sectional view and Fig. 3 a scrap view in the direction of the pipe axis.

In these figures, 1 represents an upstream pipe length which is intended to be a section forming virtually a permanent part of the power unit constituted in this case by an exhaust duct immediately behind a gas turbine and containing an internal co-axial conical fairing indicated at 2. The downstream length of the jet pipe is shown at 2, this being plain cylindrical pipe. It is between these two sections that a degree of flexibility is required about a horizontal diameter. The pipe section 1 is constructed mainly of sheet metal and to it is attached, for example by welding, a short extension sleeve 3 to which is in turn attached by welding, rivetting or the like, an annular radially extending plate or web 4. Similarly attached to the pipe length 2 is a second web 5. At the outer margins these webs are inter-attached through an annular rim 6 having fibre or like heat resistant gaskets 7 on each side, this inter-attachment preferably being by bolts and nuts represented at 8 for detachability of the sections. The sleeve 3 overlaps the end of the pipe length 2 and between these there is a fibre packing 9. The end of the length 2 may have axially directed slits 10 in its skirt to afford flexibility and freedom for relative movement by affording flexibility. In Fig. 2 it will be seen that the adjacent ends of pipe lengths 1 and 2 present a gap indicated at 11 and this has been somewhat exaggerated in the drawing. In actual practise this gap will be left only sufficiently large to permit the required degree of misalignment deflection and to meet such circumstances of thermal expansion and tolerances as may be required. The gap, whilst it represents a departure from strict smoothness of the internal pipe wall, does not represent a substantial departure since the stepping which it introduces is very small by comparison with the dimensions of the pipe as a whole. It will be appreciated that the spigot and socket joint formed by the end of the section 2 and the sleeve 3 is not in itself an effectively gas tight joint, but that gas tightness is afforded by the fact that the structure 4, 5, 6, 7 is gas tight.

Endwise loads are transmitted between the pipe lengths across the joint so constituted by a pair of stirrup-like links 12 which circumvent the web structure. The link 12 is attached by the pins 13 which are preferably contrived so as to be easily removable to bosses 14 which are in turn attached to flanges 15 provided externally on the pipe sections. These flanges incidentally reinforce the ends of the pipe lengths to maintain their circularity.

The construction above described is as stated based on the assumption that expectant deflections will be mainly in one plane. There may however be cases where deflections or mal-alignment tend to rise in various directions and in such case it is proposed to provide a plurality of links such as 12 arranged for example at 120° about the axis of the pipe and to attach the links to the pipe lengths with some freedom of movement so that axial loads between the pipe lengths will always be met by at least one link. In the construction described it will be seen that detachment is a fairly simple matter, merely involving the removal of the links 12 and the bolts 8 with subsequent dis-engagement of the mating that since gas-tightness depends ultimately on spigot and socket joint. It may also be remarked that since gas-tightness depends ultimately on the joint made at the margin of the flexible structure and this margin is deliberately somewhat flexible, it is not difficult to achieve a good joint without having to take excessive care in manufacturing and fitting.

I claim:

1. A jet-propulsion jet pipe having axially successive coaxial pipe sections mutually arranged end to end to be capable of longitudinal movement and lateral angular deflection one relative to the other, and interconnecting means between said sections, said interconnecting means comprising gas-tight pliable jointing means adapted to yield flexibly without substantial resistance to accommodate either deflecting or longitudinal loads, and means for relieving said jointing means of axially directed loads, said interconnecting means being wholly external to said pipe sections and the latter presenting a substantially smooth uninterrupted internal surface.

2. A jet-propulsion jet pipe comprising two lengths of pipe of equal internal end diameter arranged end to end so as to be capable of lateral angular deflection one relative to the other, a pliable sealing structure attached hermetically to both lengths of pipe externally thereof, said sealing structure being adapted to yield flexibly to accommodate either deflecting or longitudinal loads, and means to transmit axially directed loads from one pipe length to the other to the exclusion of said sealing structure while permitting said deflection and longitudinal movement and flexible distortion of said sealing structure.

3. A jet-propulsion jet pipe comprising two lengths of pipe of equal internal end diameter arranged end to end so as to be capable of lateral angular deflection one relative to the other, a pliable sealing structure attached hermetically to both lengths of pipe externally thereof, said sealing structure including a tubular element overlapping and surrounding the adjacent ends of the lengths of pipe, hermetically attached to one of the pipe lengths and slidably engaging the other pipe length within said sealing structure, said pliable sealing structure being adapted to yield flexibly to accommodate either deflecting or longitudinal loads, and means to transmit axially directed loads from one pipe length to the other to the exclusion of said sealing structure while permitting said deflection and longitudinal movement and flexible distortion of said sealing structure.

4. A jet-propulsion jet pipe comprising two lengths of pipe of equal internal end diameter arranged end to end so as to be capable of lateral angular deflection one relative to the other, a sealing structure attached hermetically to both lengths of pipe externally thereof, said sealing structure being adapted to yield flexibly to accommodate either deflecting or longitudinal loads, and two link members attached externally to both lengths of pipe at diametrically opposite locations, said link members yielding elastically to accommodate longitudinal relative movement of said pipe lengths and also to permit said angular deflection approximately about that diameter while transmitting axially directed loads from one pipe length to the other.

5. A jet-propulsion jet pipe comprising two lengths of pipe of equal internal end diameter arranged end to end so as to be capable of lateral angular deflection one relative to the other, a sealing structure attached hermetically to both lengths of pipe externally thereof, and said sealing structure being adapted to yield flexibly to accommodate either deflecting or longitudinal loads, link members attached externally to both lengths of pipe to transmit axially directed loads from one pipe length to the other, said link members yielding elastically to accommodate longitudinal relative movement of said pipe lengths and also to permit said angular deflection of one pipe length relative to the other and consequent deformations of said structure, said link members lying wholly outside and extending radially beyond said structure.

6. A jet-propulsion jet pipe comprising two lengths of pipe arranged substantially aligned and being mutually engaged by a spigot arrangement affording sliding freedom, said pipe lengths being capable of lateral angular deflection relative one to another, a sealing structure attached hermetically to both lengths of pipe externally thereof, said sealing structure being adapted to yield flexibly to accommodate either deflecting or longitudinal loads, and link members attached externally to both lengths of pipe to be capable of transmitting axial loads from one length to the other, said link members yielding elastically by distortion of their structure to permit said angular relative deflection between said lengths.

7. A jet pipe according to claim 6, in which the said flexible sealing structure comprises radially extending annular walls joined to the respective pipe lengths at their inner margins and jointed together in the region of their outer margins.

8. A jet-propulsion jet pipe having axially successive coaxial pipe sections mutually arranged to be capable of longitudinal movement and lateral angular deflection one relative to the other, and interconnecting means between said sections, said interconnecting means comprising gas-tight pliable jointing means adapted to yield without substantial resistance to accommodate either deflecting or longitudinal loads and axial-load transmitting connecting means adapted to yield to accommodate said deflection and movement while sustaining to the exclusion of said jointing means axial-load between said sections, both said jointing and axial-load transmitting means being arranged externally of said pipe sections so that the latter, apart from any end clearance between them, present internally a substantially smooth uninterrupted surface.

RODERICK CRISTALL McLEOD.

REFERENCES CITED

The following references are of record in the file of this patent:

UNITED STATES PATENTS

| Number | Name | Date |
|---|---|---|
| 332,906 | Karwiese | Dec. 22, 1885 |
| 1,037,554 | Shoemaker | Sept. 3, 1912 |
| 1,871,627 | Massa | Aug. 16, 1932 |
| 1,974,780 | Mann | Sept. 25, 1934 |
| 2,318,006 | Mercier | May 4, 1943 |
| 2,337,038 | Fentress | Dec. 21, 1943 |